April 6, 1926.  
G. A. ROHM ET AL  
1,579,395  
PEDAL LOCK FOR MOTOR VEHICLES  
Filed Oct. 1, 1924
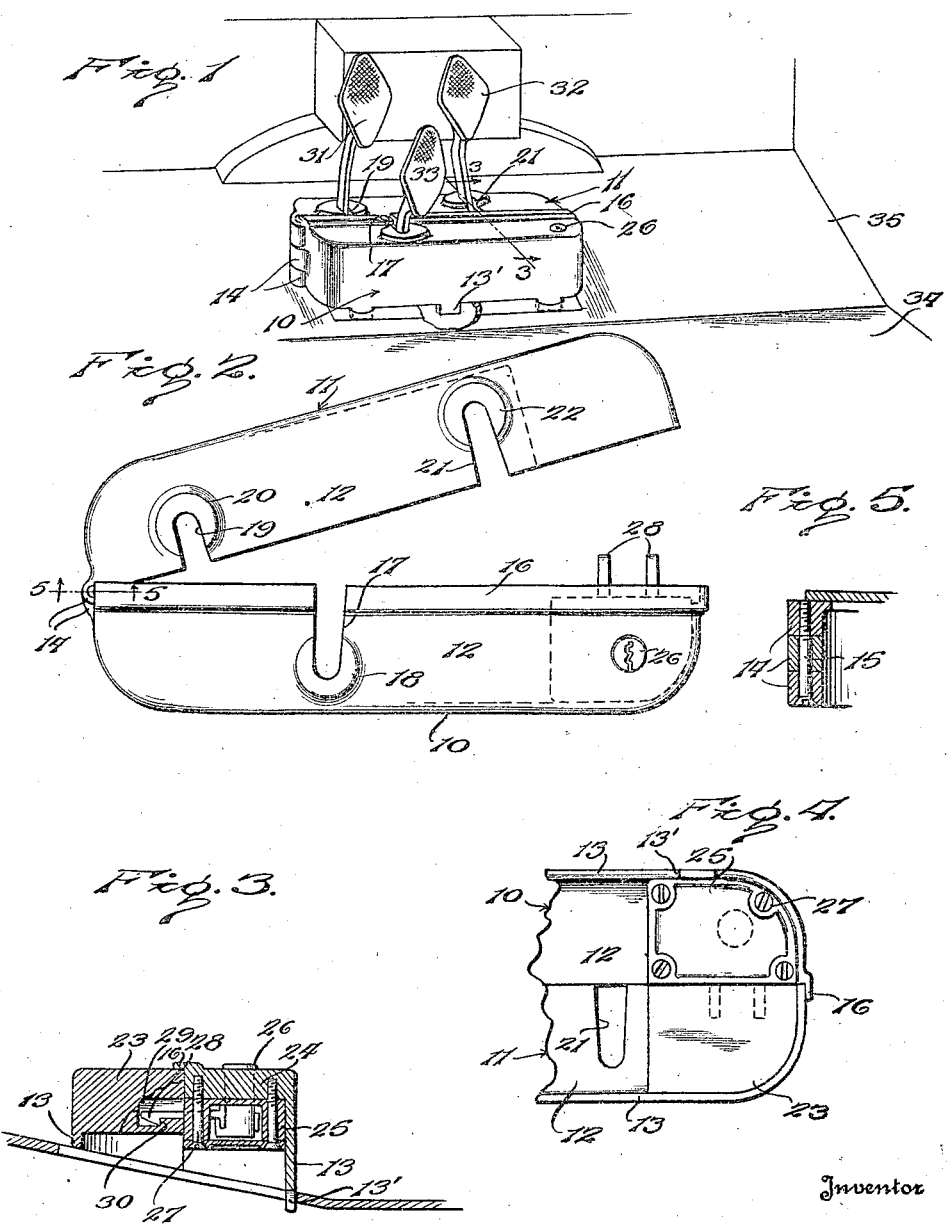
Inventor  
G. A. Rohm & W. P. Marek  
By Lacey & Lacey, Attorneys Patented Apr. 6, 1926.

1,579,395

UNITED STATES PATENT OFFICE.

GEORGE A. ROHM AND WILLIAM P. MAREK, OF BALTIMORE, MARYLAND.

PEDAL LOCK FOR MOTOR VEHICLES.

Application filed October 1, 1924. Serial No. 740,996.

*To all whom it may concern:*

Be it known that we, GEORGE A. ROHM and WILLIAM P. MAREK, citizens of the United States, residing at Baltimore, Maryland, have invented certain new and useful Improvements in Pedal Locks for Motor Vehicles, of which the following is a specification.

This invention relates to an improved pedal lock for motor vehicles, being particularly designed for use in connection with a well known make of vehicle employing a clutch pedal, a brake pedal, and a reverse pedal arranged adjacent each other and disposed to be foot operated for controlling the vehicle, and seeks, among other objects, to provide a locking device which may be readily applied about the pedals for securing the pedals against movement independently of each other.

The invention seeks, as a further object, to provide a locking device embodying swingingly connected complemental members slotted to receive the pedals and wherein one of said members will be equipped with a lock housed and protected by said member and adapted to secure the members against separation.

And the invention seeks, as a still further object, to provide a locking device which will be sturdy in its construction and which cannot be easily mutilated or wrongfully detached.

Other and incidental objects will appear hereinafter.

In the accompanying drawings:

Figure 1 is a perspective view showing our improved pedal lock applied,

Figure 2 is a top plan view of the device, the complemental members of the device being swung apart, Figure 3 is a detail sectional view on the line 3—3 of Figure 1, looking in the direction indicated by the arrows, Figure 4 is a fragmentary plan view particularly showing the mounting of the lock employed, and Figure 5 is a detail sectional view on the line 5—5 of Figure 2.

In carrying the invention into effect, we employ a pair of complemental argle-shaped locking members 10 and 11 each provided with a top wall 12 and one side wall 13. As particularly brought out in Figure 2, the members 10 and 11 are formed with rounded outer corners and the side walls of said members are continued to provide the end walls thereof. The side wall of the member 10 is, as shown in Figure 3, relatively wide and the side wall of the member 11 is relatively narrow, while the end walls are provided with alined registering lower edges sloping from the lower edge of the side wall of the member 11 to the lower edge of the side wall of the member 10, and formed on said wall of the member 10 at its lower edge, are longitudinally spaced lugs 13'. Formed on the members at corresponding ends thereof are mating hinge lugs 14 accommodating a cap screw 15 which, as shown in Figure 5, is inserted through the two lowermost of said lugs and screwed into the upper lug, swingingly connecting the sections, and, in this connection, it is to be observed that in disposing the screw in the manner indicated, said screw cannot be removed when the device is applied. Furthermore, it will be observed that the lugs 14 will prevent the insertion of a tool between the adjacent ends of the sections to effect separation thereof, and formed on the walls of the member 10 to overhang the member 11 is a lip 16 adapted to provide a closed joint between the members. Formed in the top wall of the member 10 is a slot 17 to accommodate a reverse pedal and reinforcing the wall of said slot at its inner end is a surrounding upstanding boss 18, the wall 12 of said member being thickened to form the boss. The member 11 is likewise provided near one end with a slot 19 to receive a clutch pedal and upstanding at the inner end of said slot is a reinforcing boss 20 like the boss 18. Near its opposite end, the member 11 is further provided with a slot 21 to receive a brake pedal. The slot 21 is somewhat longer than the slot 19 and associated therewith is a reinforcing boss 22 like the boss 20.

Integrally formed on the member 11 at its forward end, as shown in Figures 3 and 4, is a catch block 23 lying within said member at the angle between the outer side wall and front end wall thereof. The member 10 is likewise provided at its forward end with an oppositely disposed block 24 and seating flat against said block within said member is an appropriate lock 25 having the barrel 26 thereof extending upwardly through the block to receive a key. Extending through the lock are cap screws screwed into the block 24, these screws being concealed by and housed within the member 10. The lock is provided with appropriate projecting catch members 28 and formed in the block 23 of the member 11 to accommodate said catch members are recesses 29 having shoulders 30 for engagement by the catch members. The catch members are preferably spring pressed so that when the members 10 and 11 are closed together, they will be automatically locked in closed mating position.

In Figure 1 of the drawings, we have shown our improved device applied to the operating pedals of a conventional motor vehicle. The clutch pedal is indicated at 31, the brake pedal at 32, and the reverse pedal at 33, these pedals normally standing, when the vehicle is at rest, in the relative positions shown. Accordingly, by swinging the members 10 and 11 apart, said members may be fitted about the pedals to receive the pedal 33 in the slot 17 of the member 10 as well as to receive the pedals 31 and 32 in the slots 19 and 21 of the member 11, when, after inserting the lugs 13' in the lower ends of the pedal slots in the vehicle floor, the members may be closed together and locked about the pedals. The members will thus cooperate to form a box like structure enclosing the pedals at the floor of the vehicle and, in this connection, it is to be observed that the vehicle floor is provided with the usual flat portion 34 as well as the inclined portion 35 at the forward end of the floor. The side walls 13 of the members 10 and 11 are accordingly of different widths while the end walls are tapered so that the device will, when applied, rest in substantially horizontal position, flat against the portion 35 of the floor. The lugs 13' are provided to engage in the lower ends of the pedal slots for locking the device against forward tilting movement. Without these lugs, forward pressure on the pedals would serve to tilt the device forwardly and upwardly. However, the presence of the lugs will prevent such tilting of the device since, should forward pressure be applied to the pedals, the lugs will bind against the lower ends of the slots in the floor and thus limit the device against rocking movement. The device will thus be held against displacement in all directions so that unauthorized use of the vehicle will be effectually prevented and since a closed joint is provided between the members 10 and 11 and the lock 25 and its fastening devices 27 are enclosed while the pivot screw 15 is disposed with its head presented downwardly, the members 10 and 11 cannot be easily released by any wrong-intending party and removed from about the pedals.

Having thus described the invention, what we claim is:

1. A lock for the control pedals of a motor vehicle the same consisting of a box like structure closed at the top, ends and sides, and open at the bottom and comprising complemental members hingedly connected at one end and provided at the opposite end with locking means enclosed thereby, the meeting edges of the top section being provided with pedal receiving slots.

2. A lock for the control pedals of a motor vehicle the same consisting of a box like structure closed at the top, ends and sides, and open at the bottom and comprising complemental members hingedly connected at one end and provided at the opposite end with locking means enclosed thereby, the meeting edges of the top section being provided with pedal receiving slots, and the rear wall having depending lugs to enter the rear ends of the pedal slots in the floor to prevent tilting of the lock.

3. A lock for the control pedals of a motor vehicle, the same comprising complemental front and rear sections, each of the sections consisting of a top and depending side and end flanges, the rear side flange being wider than the front flange and having depending lugs at its lower edge, and the end flanges tapering and increasing in width from front to rear, the tops of the sections having pedal receiving slots in their meeting edges, means pivotally connecting the sections at one end, and locking means housed within the sections at the opposite end.

In testimony whereof we affix our signatures.

GEORGE A. ROHM. [L. S.]
WILLIAM P. MAREK. [L. S.]